United States Patent
Stevens et al.

(12) 
(10) Patent No.: US 6,272,580 B1
(45) Date of Patent: Aug. 7, 2001

(54) APPARATUS AND METHOD FOR DYNAMICALLY ELEVATING A LOWER LEVEL BUS MASTER TO AN UPPER LEVEL BUS MASTER WITHIN A MULTI-LEVEL ARBITRATION SYSTEM

(75) Inventors: Jeff Stevens, Spring; Robert A. Lester, Houston; Phillip M. Jones; Jeff W. Wolford, both of Spring; Peter Lee, Houston, all of TX (US)

(73) Assignee: Compaq Computer Corp., Houston, TX (US)

( * ) Notice: Subject to any disclaimer, the term of this patent is extended or adjusted under 35 U.S.C. 154(b) by 0 days.

(21) Appl. No.: 09/268,825

(22) Filed: Mar. 16, 1999

(51) Int. Cl.[7] ................................. G06F 13/362
(52) U.S. Cl. ........................... 710/116; 710/243
(58) Field of Search .................... 710/111, 116, 710/120, 123, 243

(56) References Cited

U.S. PATENT DOCUMENTS

| | | |
|---|---|---|
| 4,991,084 | 2/1991 | Rodiger et al. . |
| 5,088,024 | 2/1992 | Vernon et al. . |
| 5,729,702 | 3/1998 | Creedon et al. . |
| 5,832,278 | * 11/1998 | Pham .................................. 710/111 |
| 5,983,302 | * 11/1999 | Christiansen et al. ............... 710/113 |

* cited by examiner

*Primary Examiner*—Glenn A. Auve
(74) *Attorney, Agent, or Firm*—Kevin L. Daffer; Conley, Rose & Tayon P.C.

(57) ABSTRACT

A computer system, bus interface unit, and method are provided to allocate requests to a shared bus within the computer system. The bus interface unit includes an arbiter which employs a multi-level, round-robin arbitration protocol. Configuration registers are programmed during boot-up of the computer system by assigning a subset of peripheral devices, bus agents, requesters, or bus masters to either a high priority ring or a low priority ring, if two levels of arbitration are used. The status of a low priority device can be elevated to equal priority with a high priority device by assigning the low priority device to a high priority port within the high priority ring if certain circumstances occur. Namely, if data transfers to or from the low priority device are terminated, then the low priority device will be promoted to a high priority device so that it need not wait until after the all high priority device requests have been polled. Instead, the elevated low priority device is placed on the same level of priority as the high priority devices so that its request can be readily serviced and the transaction completed during a data transfer retry operation.

22 Claims, 4 Drawing Sheets

APPARATUS AND METHOD FOR DYNAMICALLY ELEVATING A LOWER LEVEL BUS MASTER TO AN UPPER LEVEL BUS MASTER WITHIN A MULTI-LEVEL ARBITRATION SYSTEM

BACKGROUND OF THE INVENTION

1. Field of the Invention

This invention relates to a computer system and, more particularly, to a device and method for granting accesses to a peripheral bus according to a multi-level prioritization scheme which can elevate or promote a lower level bus master to an upper level prioritization ring if the target of the lower level bus master becomes unavailable or is data transfer from the lower level bus master is interrupted.

2. Description of the Related Art

It is well known that computer systems in general employ a mechanism for allocating a shared resource. That shared resource may involve a bus on which multiple bus agents are connected. The allocation mechanism and its supporting hardware define arbitration protocols by which only one agent at a time can achieve mastership of the common bus.

If an agent wishes to communicate with another agent, the first agent typically sends a signal requesting mastership across the common bus connecting the two agents. The first agent soliciting mastership is often called the bus master, and the agent that responds to that master is called the slave. Some agents can act only as masters, some only as slaves, and others as either masters or slaves.

If many agents attempt to gain access to a common bus at the same time, the arbitration protocol must decide which agent should be given priority. There are many types of arbitration protocols currently used to formulate that decision. For example, arbitration can be performed either in a round-robin fashion or by a fixed priority scheme. Round-robin arbitration involves assigning priority in a cyclical sequence or loop. If two or more agents wish to use the common bus resource, access is granted to the first agent within the loop closest to the last agent which used the common bus resource. Accordingly, a pointer is directed to a port upon the round-robin arbitration ring and thereby points to the last agent to use the bus. The pointer is rotated about the ring of ports each time access is granted. A fixed priority arbitration scheme involves assigning a unique priority to each agent. If two or more agents wish to use the bus resource, access is always granted to the device with the highest priority value. Examples of various round-robin and fixed priority schemes are set forth in U.S. Pat. No. 5,088,024 (herein incorporated by reference).

The fixed priority arbitration principle can advantageously assign a higher priority to agents which must gain access to the bus quickly in order to avoid malfunction or loss of information. Such agents are often referred to as low latency agents. High latency agents, however, can wait for a longer period of time without suffering ill effects. An unfortunate aspect of a fixed priority scheme is that the priority value of each agent is fixed and cannot be readily changed. Conversely, a round-robin arbitration scheme gives equal opportunities to all agents, such that each agent is given a turn at having the highest priority. However, once an agent has terminated its access, it must wait its turn until all the other agents within the ring have culminated their accesses. Agents with low latency may therefore be unfortunately starved of access to the bus.

It would be desirable to introduce a multi-level arbitration mechanism which can assign higher priorities to low latency agents and lower priority to high latency agents. As defined henceforth, the shared resource is a peripheral bus, and the agents are peripheral devices which are operably connected to that bus. The peripheral bus includes a peripheral component interface ("PCI") bus and peripheral devices include all devices either directly or indirectly coupled to, e.g., the PCI bus. The peripheral devices may therefore entail devices such as the microprocessor which is connected to the peripheral bus through a bus interface unit.

The advantage of introducing a multi-level arbitration system within the confines of a round-robin arbitration scheme would be particularly beneficial if the high and low priority peripheral devices can be dynamically switched between the high and low level priority rings. Accordingly, it would be desirable to introduce a mechanism and method for altering the assignment of peripheral devices from a port upon the low priority ring to a port on the high priority ring during run time. This benefit would more adequately service low priority peripheral devices whose data transfer is somehow interrupted and must thereafter be retried.

SUMMARY OF THE INVENTION

The problems outlined above are in large part solved by an improved computer system arbitration protocol. The improved protocol entails a multi-level round-robin arbitration scheme which assigns various agents or peripheral devices to either the high priority arbitration ring or the low priority arbitration ring (if two rings are used) during boot-up of the computer system. A configuration register is programmed during boot-up to retain values indicating the high or low priority status of each peripheral device. In addition, the configuration register is programmed to ensure an initial priority within the high and low priority rings. For example, CPU requests are given a higher priority than requests from an Industry Standard Architecture ("ISA") peripheral device during the initial arbitration sequence of either the high or low priority arbitration rings. The configuration register therefore assigns specific peripheral devices to specific ports on either the high or low priority rings.

It is noted that more than two levels and, therefore, more than two priority rings may be employed if desired. As such, the present arbitration system involves multiple rings, each of which have dissimilar priority from one another.

The high priority ring is designed so that peripheral devices connected to high priority ports will be given priority over any peripheral devices connected to low priority ports within the low priority ring. As such, the devices on the high priority ring will be polled first, with one port reserved on the high priority ring for transitioning to the low priority ring. It is not until after all high priority devices between the high priority pointer and the low priority ring ported on one high priority port will the first low priority device be polled. If the high priority ring involves M number of potential masters then, depending on where the high priority pointer is located, up to M arbitration cycles are needed before priority is given to a low priority device. Once the low priority device access has been completed, then both the high and low priority pointers are advanced one port location. If there are N number of low priority devices assigned to low priority ports then, in a worst case scenario, a low priority device will get access to the bus once every N times M arbitration cycles. Almost all peripheral buses employ a sequence of granting mastership before transferring data. The arbitration cycle must therefore precede a data transfer cycle. Unfortunately, instances may arise during data transfer which can temporarily disrupt that transfer. A procedure known as "retry" is often used as an attempt to re-arbitrate for the bus and, therefore, complete the previously interrupted data transfer. If data transfer to or from a low priority device is interrupted, the low priority device would have to wait up to N times M arbitration cycles before it can regain mastership of the bus during its retry operation. This delay is in most instances unacceptable since data transfer of the low priority device is often a prerequisite for subsequent data transfers of high priority devices. Accordingly, one benefit hereof is to implement a mechanism and methodology for temporarily elevating a low priority device to the high priority ring if its data transfer should become interrupted. In this fashion, the low priority device is given equal status with high priority devices and will be granted access to the bus ahead of its previous counterpart low priority devices. However, since the high priority pointer is incremented one port location, the elevated low priority device must wait a maximum of M times before it is again granted access. This is helpful to ensure undue thrashing of ineffective requests from a locked device resource.

By elevating a low priority device to a high priority ring, the low priority device would be assured of it being serviced within an optimal timeframe which is not too long as would cause latency or out-of-order problems, or too short as would cause undue repetition of an ineffective or inappropriate request which would absolve itself if certain other high priority devices are allowed to proceed first.

A temporary elevation register is used to note which low priority peripheral devices are elevated to a high priority status. Bit locations within the temporary elevation register correspond to similar bit locations within the configuration register. Values within the corresponding bit locations are logically combined to produce either a "1" or a "0" value outcome. Those outcomes are stored in a register of the same size as the configuration register and the temporary elevation register. That register is then polled by looking for 1s and 0s depending on whether the high priority ring or low priority ring, respectively, is queried. All devices corresponding to a 1 value within the register subsequent to the high priority pointer will be given priority based on their relationship or proximity subsequent to that pointer. All devices having a 0 value within the register are given priority if high priority devices between the high priority pointer and the high priority slot occupied by the low priority ring do not issue a bus request. In this instance, the prioritization will transition to devices on the low priority ring (i.e., devices having a 0 value within the outcome register).

Broadly speaking, a bus arbiter is provided. The bus arbiter comprises a low priority arbitration ring having a plurality of low priority ports assigned to respective low priority peripheral devices. The arbiter further includes a high priority arbitration ring having a plurality of high priority ports assigned to respective high priority peripheral devices as well as one of the low priority peripheral devices elevated from the low priority ports. The low priority peripheral device is elevated during times in which data transfers to and from that low priority peripheral device are interrupted.

According to another embodiment, a computer is provided. A computer includes a microprocessor and a plurality of high and low priority peripheral devices. At least one of the peripheral devices is coupled to a printed circuit board separate from another printed circuit board on which the microprocessor resides. Accordingly, at least one of the peripheral devices may be arranged upon a card or coupled to a card separate from a motherboard on which the microprocessor is either arranged or directly coupled. An arbiter is provided within the computer and coupled to a peripheral bus on which the plurality of high and low priority peripheral devices are directly or indirectly coupled. The arbiter includes a high priority arbitration ring having a plurality of high priority ports assigned to the plurality of high priority peripheral devices. The arbiter further includes a low priority arbitration ring having a plurality of low priority ports assigned to the plurality of low priority peripheral devices. One of the low priority peripheral devices is assigned to one of the plurality of high priority ports and is granted mastership on the peripheral bus before any of the other low priority peripheral devices whenever a data transfer to or from the one of the plurality of low priority peripheral devices is interrupted or retried. Accordingly, if data transfer is being retried to the elevated low priority peripheral devices, that device is granted mastership over other low priority peripheral devices and is of equal priority status to that of the high priority peripheral devices coupled to the high priority ports.

According to yet another embodiment, a method is provided for granting accesses to a peripheral bus. The method includes configuring a first register to assign a high priority grouping of peripheral devices to a high priority ring of an arbiter and a low priority grouping of peripheral devices to a low priority ring of the arbiter. A second register is configured to assign one of the low priority peripheral devices to the high priority ring if data transfer to or from said one of the low priority peripheral devices within a low priority grouping is interrupted. As such, the first register is a configuration register which is presented values during configuration of the computer system, whereas the second register is a temporary elevation register assigned values whenever data transfers are interrupted. Access to the elevated peripheral device within the low priority grouping is granted before granting access to any of the remaining peripheral devices within the low priority grouping.

BRIEF DESCRIPTION OF THE DRAWINGS

Other objects and advantages of the invention will become apparent upon reading the following detailed description and upon reference to the accompanying drawings in which.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 1:
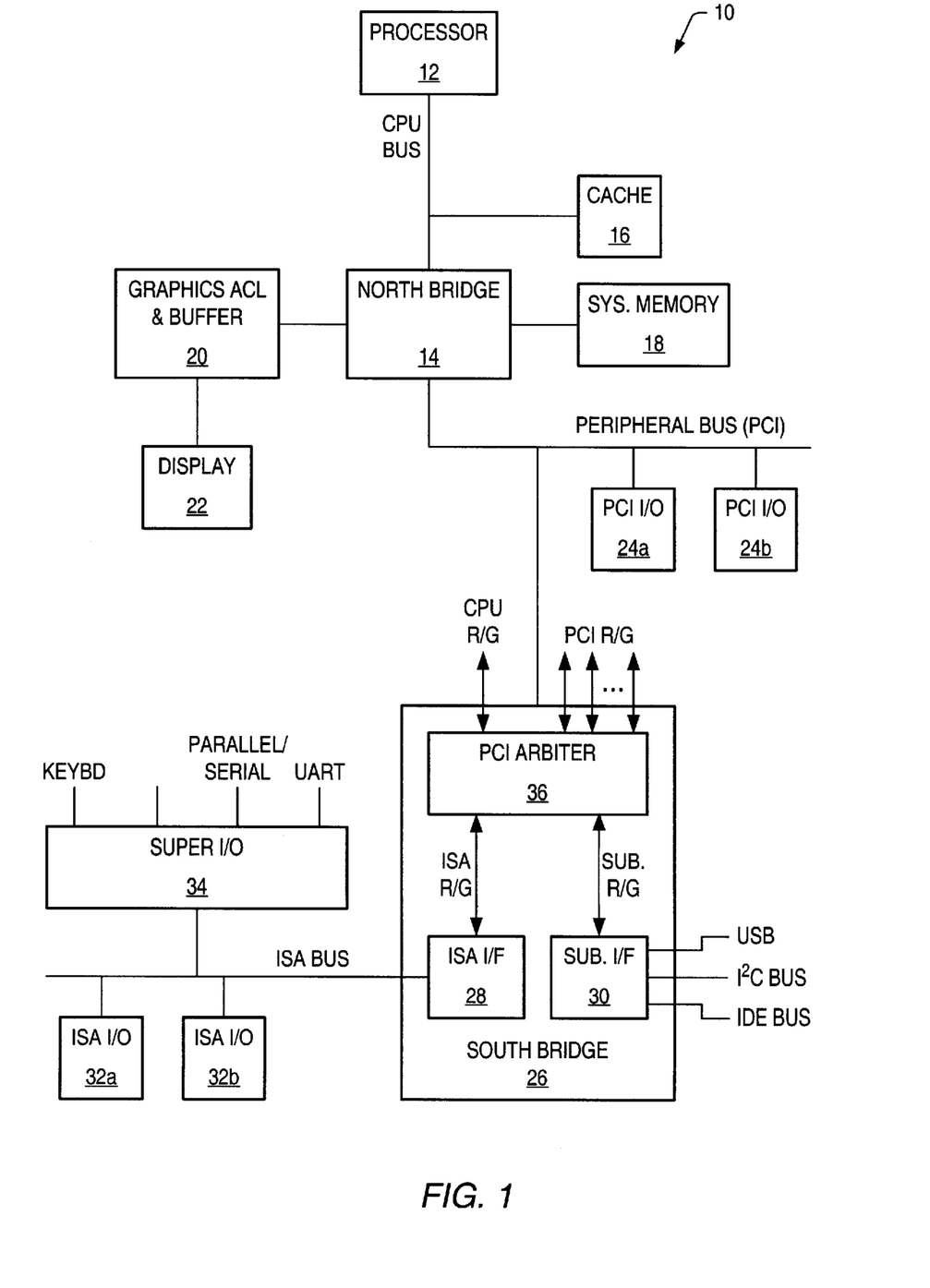
FIG. 1 is a block diagram of a computer system comprising various buses and bus interface units.

Turning to the drawings, FIG. 1 illustrates a computer 10 having multiple buses, including a CPU bus, a mezzanine or PCI bus, and multiple peripheral buses. In the example shown, the peripheral buses include an ISA bus, an IDE bus and a I$^2$C bus. The CPU bus connects a CPU or processor 12 to a bus interface unit or northbridge 14. A cache memory 16 can be embodied within or external to CPU 12.

Northbridge 14 provides an interface between components clocked at dissimilar rates. According to one embodiment, northbridge 14 interfaces a slower PCI bus and a faster CPU bus. Northbridge 14 may also contain a memory controller which allows communication to and from system memory 18. A suitable system memory 18 comprises DRAM or synchronous DRAM ("SDRAM"). Northbridge 14 may also include graphics support to allow communication to a graphics accelerator and buffer 20. A graphics support, included within an advanced graphics port such as the Accelerated Graphics Port (AGP), provides a high performance, component level interconnect targeted at three dimensional graphics display applications and is based on performance extensions or enhancements to PCI.

AGP interfaces are generally standard in the industry, the description of which is available from Intel Corporation. Generally speaking, AGP is physically, logically, and electrically independent of the PCI bus and is intended for the exclusive use of a display device 22. Display 22 is any electronic display upon which an image or text can be presented. A suitable display 22 includes a cathode ray tube (CRT), a liquid crystal display (LCD), etc.

Northbridge 14 is generally considered an application specific chip set, or application specific integrated circuit (ASIC) that provides connectivity to various buses, and integrates other system functions such as memory interface and P1394. System memory 18 is considered the main memory and refers to a portion of addressable memory that the majority of memory accesses target. System memory 18 is considered the largest continuous memory space of computer 10.

Northbridge 14 contains various sub-components, some of which serve as an interface to processor 12, system memory 18 and the graphics accelerator or frame buffer associated with display 22. A PCI interface is also included within northbridge 14 to allow accesses to and from input/output (I/O) devices 24 connected to the PCI bus.

Also connected to the PCI bus is a southbridge 26. Southbridge 26, similar to northbridge 14, includes various interfaces or controllers connected to respective buses. In the example shown, a controller or interface exists within southbridge 26 to handle communication between devices on the PCI bus, the IDE bus, the Universal Serial bus ("USB"), the ISA bus and the I$^2$C bus. The controllers, or interface units, serve to adapt transfer protocols from one bus to that of another. The interfaces also provide buffers to handle what could be substantially dissimilar transfer rates between buses.

Associated with each bus is a peripheral device. For example, a peripheral device includes the processor linked to the PCI bus via northbridge 14. According to known terminology, various controllers or interface units are coupled within southbridge 26. As such, southbridge 26 includes an ISA controller 28 and a sub-function controller 30. Controller 28 provides an interface to an ISA bus which has input/output devices 32 connected thereto. Also connectable to the ISA bus is a single chipset, often referred to as a Super I/O 34. For example, Super I/O 34 can embody a real time clock (RTC) and a battery-backed CMOS RAM memory. The Super I/O may also provide interface to a keyboard, parallel and serial ports, as well as a UART.

In addition to the ISA bus, southbridge 26 may also provide connectivity to a other peripheral buses, such as a USB, a I$^2$C bus, and/or an IDE bus. Details regarding Super I/O chipset can be obtained from, e.g., National Semiconductor Corporation. The USB, I$^2$C, and IDE bus protocols are generally well known. For example, I$^2$C bus protocol can be obtained from Phillips Semiconductor Corporation.

Central to the mechanism for granting accesses upon the PCI bus is arbiter 36. Arbiter 36 is deemed a multi-level round-robin PCI arbiter, in that it receives requests from various agents and grants an access to the PCI bus among those requests based upon a multi-level round-robin arbitration protocol. In the example shown, ten requesters or bus masters seek access to the PCI bus. Those requesters, in the order of initial priority, are: CPU request, ISA request, PCI requests 0–6, and sub-function ("SUB") request. Arbiter 36 must therefore decide from up to ten possible concurrent requests, which request to service first by forwarding a grant signal to the requesting master which is given priority.

Figure 2:
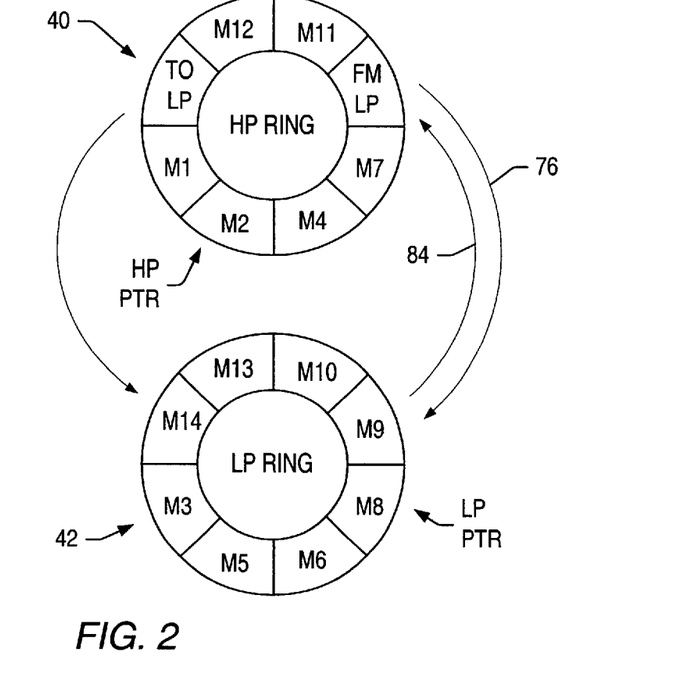
FIG. 2 is a plan view of a dual ring arbitration mechanism employed as part of the arbiter of FIG. 1, wherein pointers keep track of the highest priority bus master within the low priority and high priority round-robin arbitration rings.

FIG. 2 illustrates various ports within a high priority ring 40 and a low priority ring 42. The ports within high priority ring 40 are deemed high priority ports and are populated with various high priority peripheral devices or agents, as well as a pointer 44 which directs accesses to a "TO LP" port which is targeted to a device among low priority ring 42. Another port labeled "FM LP" within the high priority ports is populated with a specific low priority device which had been elevated from low priority ring 42. Accordingly, the ports within high priority ring 40 are configured during boot-up with connectivity to high priority devices as well as connectivity to various ports within low priority ring 42. It is only after data transmissions are interrupted that a low priority device will be elevated to FM LP port.

During boot-up from BIOS a configuration register possibly associated with the southbridge chipset will contain bit values indicating whether an associated peripheral device will be grouped within the high priority ports or the low priority ports. A programmed 1 value will indicate apportionment to the high priority ring, and a programmed 0 value will indicate apportionment to the low priority ring. The order of priority within each ring is fixed during boot-up. That is, a CPU request is given higher priority than an ISA request, and the ISA request is given a higher priority than requests to a PCI input/output device. Furthermore, any requests to a PCI input/output device is given a higher priority than a request to the sub-function controller deemed to monitor accesses upon either the USB, I²C, or the IDE buses. For example, bus master M1 can be deemed the CPU device, M2 the ISA device, M3 the first PCI I/O, etc. until M10 noted as the sub-function device. During boot-up, M1 is placed in a higher priority position than M2 within the high priority ring 40, and M3 is placed at a higher priority position than M5. This procedure is continued for assigning priority among bus masters during boot-up.

A high priority pointer may initially be presented to the CPU master after boot-up. However, while the PCI bus is undergoing reset, the grant signals are tri-stated and the initial park state will remain upon the southbridge. It is not until after the first request that the arbiter will then be parked upon the CPU and, e.g., M1.

Except for the present multi-level elevation mechanism, the PCI arbitration protocol is generally detailed in well-known PCI specifications. A bus master should assert its request line only to request ownership of the bus, and not to park itself upon the bus. A PCI master has to ensure that its grant line is asserted and the bus is idle (FRAME# and IRDY# negated) before FRAME# is asserted. However, the PCI arbiter can negate the master grant line in the same clock as FRAME# is asserted and the bus transaction is valid. Thus the present arbiter will assert the next grant at least one clock after the negation of the current grant for idle and non-idle instances. An agent's grant signal is negated either to service another request, in response to a retry on a first data phase, or in response to a time-out. The ISA grant signal cannot be negated until an ISA request is negated. If there are no current requests, the bus will be parked upon the CPU for the previous grant port depending on the configuration. At power-up, the parked agent defaults to the CPU port. All grant signals are negated during reset, except the sub-function grant for allowing the PCI reset to park upon the southbridge unit.

The functionality behind high priority and low priority pointers is to keep track of where the respective next port should begin being queried. That is, the pointers are incremented one port location after each arbitration cycle depending on whether access is given to the bus only from the high priority ring, or from the low priority ring. If access is given via the high priority ring, then only the high priority pointer will be incremented. However, if access is given from the low priority ring, then both the high and low priority pointers will be incremented. Based on this scheme, the slowest rate at which the low priority ring advances to its next request is once every M arbitration cycles, where M is the number of agents assigned to ports within the high priority ring. If no agents are assigned to the high priority ring, then the two-level round-robin arbiter reduces to a single level round-robin arbiter.

Figure 3:
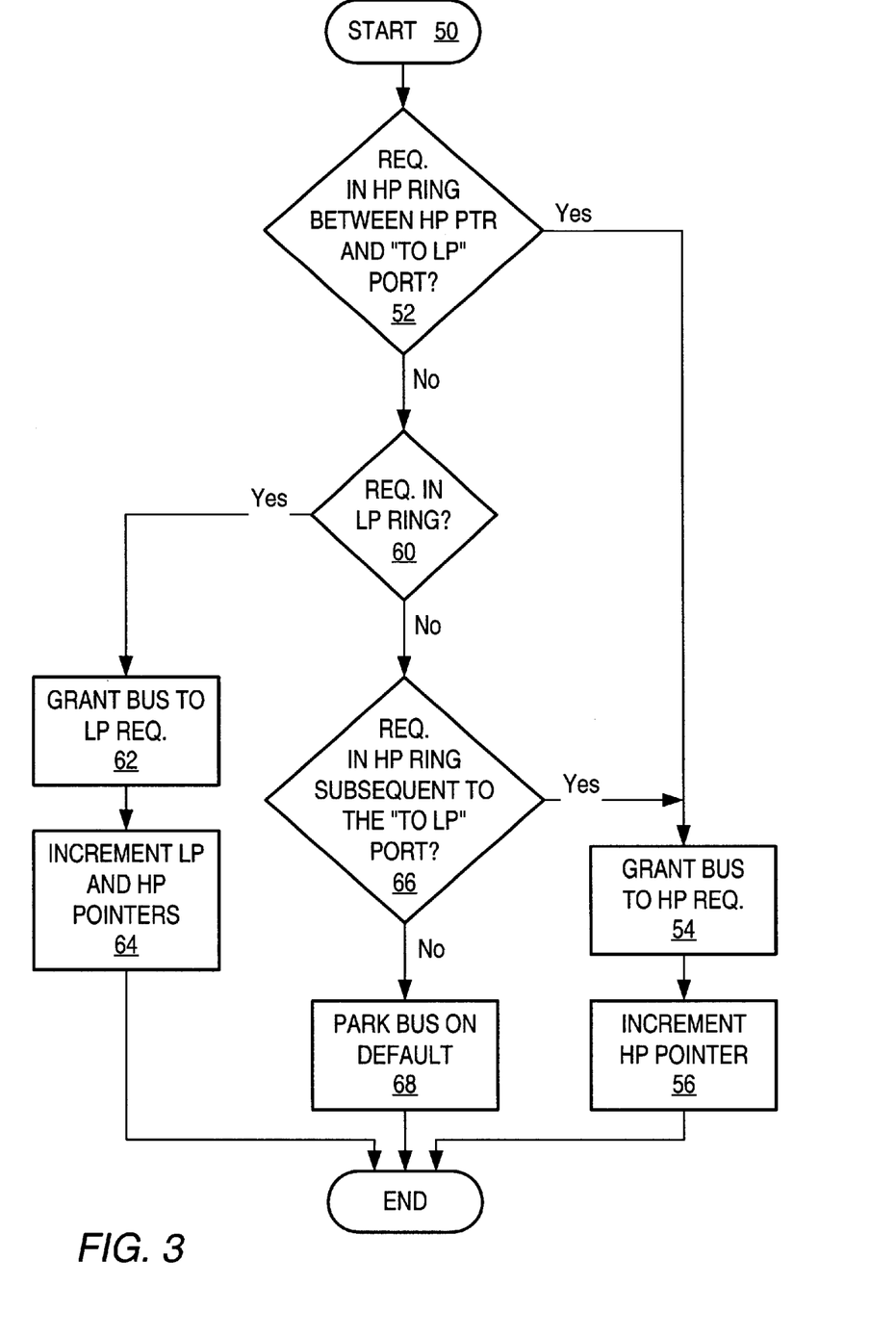
FIG. 3 is a flow diagram of sequential steps associated with granting mastership of a peripheral bus to either a master within the high priority arbitration ring or the low priority arbitration ring.

FIG. 3 illustrates sequential steps associated with granting mastership of a peripheral bus (e.g., a PCI bus ). From a start position 50, query is made as to whether a request is from a device within the high priority ring between the high priority pointer and the "TO LP" port, as indicated by reference numeral 52. In the example shown in FIG. 2, if the high priority pointer is directed to M2, then query must be made as to whether a request is initiated from M4, M7, M11, and M12. If so, then the bus is granted to the high priority request in the order of M4 before M7, before M11, and before M12, as shown by reference numeral 54. Thereafter, the high priority pointer is incremented from the port associated with M2 to the port associated with M4, as shown by reference numeral 56.

However, if a request is not initiated from the high priority ring between the high priority pointer and the "TO LP" port, then query must be made during transition to the low priority ring on whether a request is initiated within a device linked to the low priority ring, as shown by reference numeral 60. If so, then the bus is granted to the low priority requester 62 and the low priority and high priority pointers are incremented at step 64. However, if none of the low priority devices are requesting the bus, then query must be made to devices in the high priority ring which are subsequent to the "TO LP" port, as shown by reference 66. If so, then the bus is granted to that high priority requester and the high priority pointer is incremented, as indicated by numerals 54 and 56. If not, then the bus is parked upon a default requester as shown at step 68. In the example provided, the default requester can be the CPU requester or master M1. FIG. 3 illustrates three possible scenarios of polling the high priority requesters prior to the TO LP port, querying high priority requesters after the TO LP port, and establishing a park on the default port if no requests are currently undertaken.

Figure 4:
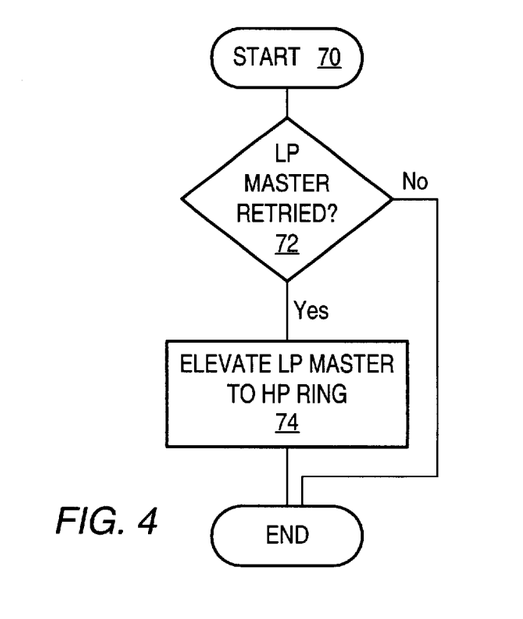
FIG. 4 is a flow diagram of sequential steps associated with elevating a low priority master to the high priority ring if the target agent becomes unavailable or the data transferred by the low priority master is interrupted and must be retried.

FIG. 4 indicates instances where a low priority master is elevated to a high priority ring and placed upon the "FM LP" high priority port during the certain instances in time. Specifically, the sequence begins at step 70, whereby a query is made as to whether a low priority master has completed its arbitration cycle and has gained access to the bus. If, for some reason, data is not completely transferred within the data transfer phase, then it is necessary to retry that transfer at a later time, possible after the low priority master is not locked, the target agent becomes available, or the grant time-out has been exceeded. In either instance, query is made as to whether the low priority master is being retried due to data interruption 72. If so, it is important that the low priority master be elevated to the FM LP port within the high priority ring 74. Elevation is maintained until after the entire packet of data from the low priority master has been transferred. If the low priority master is not being retried, then that master need not be elevated, as shown. Elevation of a low priority master to the FM LP port is also shown by reference numeral 76 in FIG. 2.

Figure 5:
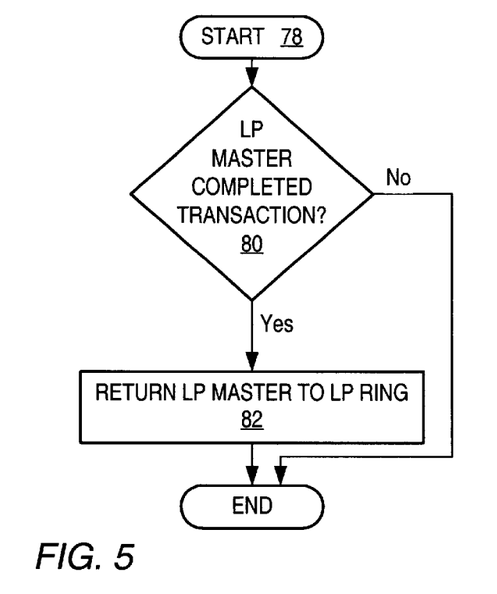
FIG. 5 is a flow diagram of sequential steps associated with demoting the elevated low priority master back to the low priority ring after the elevated low priority master is successful in completing its data transfer.

FIG. 5 further illustrates instances where the low priority master has eventually completed its transaction, as indicated by reference numerals 78 and 80. If so, then the low priority master is returned to the low priority ring, indicated by numeral 82 in FIG. 5 and 84 in FIG. 2.

While in the high priority ring, re-arbitration of the low priority master can occur once every M arbitration cycles where M is the number of agents assigned to the high priority ring. In fact, since both the high and low priority pointers have been incremented, it is likely that mastership will occur only if the remaining high priority masters are not seeking accesses to the shared bus. This means that the elevated low priority master will not again gain access until after the high priority masters interposed between the high priority pointer and the FM LP port have been queried.

Figure 6:
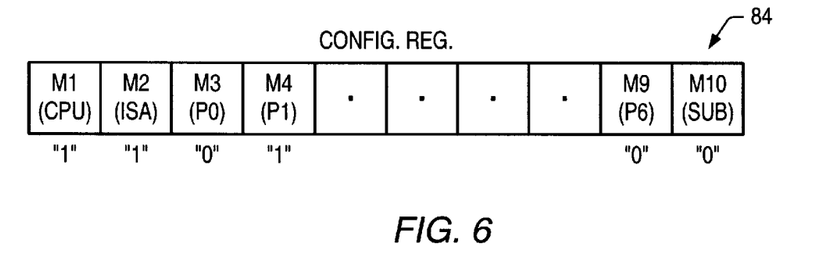
FIG. 6 is a block diagram of a configuration register having bits dedicated to respective bus masters associated with either the low or high priority rings depending on whether the associated bits are programmed with a one or zero.

FIG. 6 illustrates one example by which a configuration register 84 can be assigned values indicating whether a corresponding master is attributed to a high priority ring or a low priority ring. If a master is assigned to a high priority ring, then the configuration register 84 will have a programmed "1" value assigned to that bit position. Configuration register 84 indicates ten bit positions, each attributed to a master or requesting agent. Configuration register 84 is populated during boot-up from BIOS of the computer system shown in FIG. 1.

Figure 7:
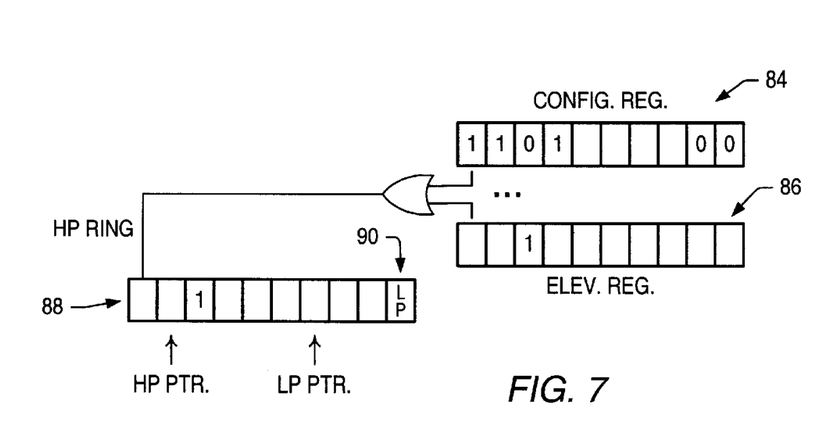
FIG. 7 is a block diagram of a mechanism for assigning bus masters among the low and high priority arbitration rings depending on comparisons between respective bits within the configuration register and an elevation register containing bits indicative of whether a bus master has been temporarily elevated to the high priority ring.

FIG. 7 illustrates one exemplary implementation by which high priority and low priority rings can be formulated and pointers directed to those corresponding rings. More specifically, an elevation register 86 is shown in combination with configuration register 84. Elevation register 86 includes bit positions equal in number to those of configuration register 84, and each bit position is assigned to a particular bus agent/master. Given the example shown in FIG. 6, configuration register 84 is configured as shown. As a further example, elevation register 86 indicates the third bit position as having a bit value of "1". This indicates that master M3 is normally a low priority master and has undergone an interruption during its data transfer, and that it is to be elevated or promoted to the high priority ring. Each bit position of registers 84 and 86 are logically compared. The output of which is presented to a corresponding bit position within register 88. Given the expressed example, the third bit position of register 86 translates to a temporary high priority status at the third bit position of register 88. As the high priority ports of the high priority ring are polled, query is made as to all bit positions having a 1 value. If the query result is that no bit positions indicate a 1 value before arriving at the TO LP port 90, then query will begin on the low priority ring whereby 0 values are queried. Incrementing the appropriate pointers take place for each bus access. Eventually the third bit position, and therefore the corresponding port of the high priority ring, will be queried and the data transfer of the corresponding elevated, low priority device will be completed. Thereafter, that elevated device will be demoted by virtue of its corresponding bit value being changed to a 0 value within elevation register 86 and corresponding register 88.

Various modifications and changes may be made as would be obvious to a person skilled in the art having the benefit of this disclosure. It is intended that the following claims be interpreted to embrace all such modifications and changes and, accordingly, the specification and drawings are to be regarded in an illustrative rather than a restrictive sense.

What is claimed is:

1. A bus arbiter for a computer system, comprising:
   a low priority arbitration ring having a plurality of low priority ports assigned to respective low priority peripheral devices;
   a high priority arbitration ring having a plurality of high priority ports assigned to respective high priority peripheral devices and to a first one of the low priority peripheral devices elevated from the low priority ports during times in which data transfers to or from said first one of the low priority peripheral devices are interrupted; and
   a high priority pointer which points to one of the high priority ports for prioritizing requests from among the high priority peripheral devices based on their proximity to the pointed-to high priority slot.

2. The bus arbiter as recited in claim 1, wherein the low priority and high priority arbitration rings comprise a round robin arbitration scheme.

3. A bus arbiter for a computer system, comprising:
   a low priority arbitration ring having a plurality of low priority ports assigned to respective low priority peripheral devices;
   a high priority arbitration ring having a plurality of high priority ports assigned to respective high priority peripheral devices and to a first one of the low priority peripheral devices elevated from the low priority ports during times in which data transfers to or from said first one of the low priority peripheral devices are interrupted; and
   a low priority pointer which points to one of the low priority ports for prioritizing requests from among the low priority peripheral devices based on their proximity to the pointed-to low priority slot.

4. The bus arbiter as recited in claim 3, wherein the low priority and high priority arbitration rings comprise a round robin arbitration scheme.

5. A computer, comprising:
   a microprocessor;
   a plurality of high and low priority peripheral devices, at least one of which is coupled to a printed circuit board separate from another printed circuit board on which the microprocessor resides;
   an arbiter coupled to a peripheral bus on which the plurality of high and low priority peripheral devices are operably coupled, the arbiter comprising:
   a high priority arbitration ring having a plurality of high priority ports assigned to the plurality of high priority peripheral devices;
   a low priority arbitration ring having a plurality of low priority ports assigned to the plurality of low priority peripheral devices;
   wherein one of the low priority peripheral devices is assigned to one of the plurality of high priority ports and is granted mastership of the peripheral bus before any other of the low priority peripheral devices whenever a data transfer to or from said one of the plurality of low priority peripheral devices is retried; and;
   a high priority pointer which points to one of the high priority ports for prioritizing requests from among the high priority peripheral devices based on their proximity to the pointed-to high priority port.

6. The computer as recited in claim 5, wherein the peripheral bus comprises a peripheral component interconnect (PCI) bus.

7. The computer as recited in claim 5, wherein each of the plurality of high priority ports is assigned to a respective one of the plurality of high priority peripheral devices.

8. The computer as recited in claim 5, wherein the low priority and high priority arbitration rings comprise a round robin arbitration scheme.

9. The computer as recited in claim 5, wherein said one of the low priority peripheral devices is assigned to said one of the plurality of high priority ports if data transfer to or from said one of the plurality of low priority peripheral devices is interrupted.

10. The computer as recited in claim 5, wherein said one of the low priority peripheral devices is assigned to said one of the plurality of high priority ports if a target peripheral device adapted to receive data from said one of the plurality of low priority peripheral devices is unavailable.

11. The computer as recited in claim 5, further comprising a configuration register having bit positions corresponding to each of said plurality of high and low priority peripheral devices, and wherein the configuration register is programmed during reset of the computer.

12. The computer as recited in claim 11, further comprising a temporary elevation register having bit positions corresponding to each of said plurality of high and low priority peripheral devices, and wherein a bit position corresponding to said one of the low priority peripheral devices receives a programmed value if data transfer to or from said one of the plurality of low priority peripheral devices is interrupted.

13. The computer as recited in claim 12, further comprising logic coupled to combine the programmed value from the temporary elevation register with the programmed value within the configuration register to determine if the peripheral device corresponding to the programmed bit positions is assigned to the high priority peripheral devices or the low priority peripheral devices.

14. A computer, comprising:

a microprocessor;

a plurality of high and low priority peripheral devices, at least one of which is coupled to a printed circuit board separate from another printed circuit board on which the microprocessor resides;

an arbiter coupled to a peripheral bus on which the plurality of high and low priority peripheral devices are operably coupled, the arbiter comprising:

a high priority arbitration ring having a plurality of high priority ports assigned to the plurality of high priority peripheral devices;

a low priority arbitration ring having a plurality of low priority ports assigned to the plurality of low priority peripheral devices;

wherein one of the low priority peripheral devices is assigned to one of the plurality of high priority ports and is granted mastership of the peripheral bus before any other of the low priority peripheral devices whenever a data transfer to or from said one of the plurality of low priority peripheral devices is retried; and;

a low priority pointer which points to one of the low priority ports for prioritizing requests from among the low priority peripheral devices based on their proximity to the pointed-to low priority port.

15. The computer as recited in claim 14, wherein the peripheral bus comprises a peripheral component interconnect (PCI) bus.

16. The computer as recited in claim 10, wherein each of the plurality of high priority ports is assigned to a respective one of the plurality of high priority peripheral devices.

17. The computer as recited in claim 14, wherein the low priority and high priority arbitration rings comprise a round robin arbitration scheme.

18. The computer as recited in claim 14, wherein said one of the low priority peripheral devices is assigned to said one of the plurality of high priority ports if data transfer to or from said one of the plurality of low priority peripheral devices is interrupted.

19. The computer as recited in claim 14, wherein said one of the low priority peripheral devices is assigned to said one of the plurality of high priority ports if a target peripheral device adapted to receive data from said one of the plurality of low priority peripheral devices is unavailable.

20. The computer as recited in claim 14, further comprising a configuration register having bit positions corresponding to each of said plurality of high and low priority peripheral devices, and wherein the configuration register is programmed during reset of the computer.

21. The computer as recited in claim 20, further comprising a temporary elevation register having bit positions corresponding to each of said plurality of high and low priority peripheral devices, and wherein a bit position corresponding to said one of the low priority peripheral devices receives a programmed value if data transfer to or from said one of the plurality of low priority peripheral devices is interrupted.

22. The computer as recited in claim 21, further comprising logic coupled to combine the programmed value from the temporary elevation register with the programmed value within the configuration register to determine if the peripheral device corresponding to the programmed bit positions is assigned to the high priority peripheral devices or the low priority peripheral devices.

* * * * *